P. L. HOWLETT.
COTTON TIE PRESS.
APPLICATION FILED AUG. 18, 1909.
988,469.
Patented Apr. 4, 1911.
3 SHEETS—SHEET 2.
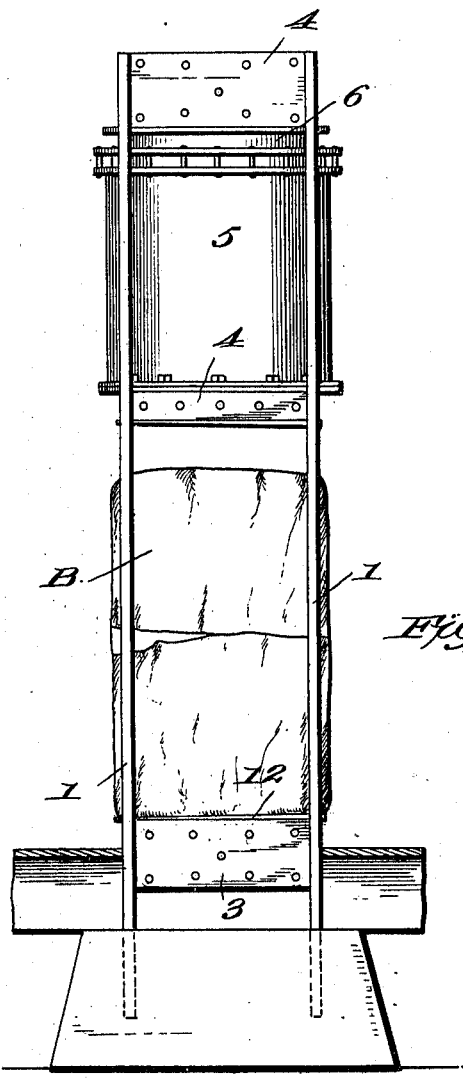
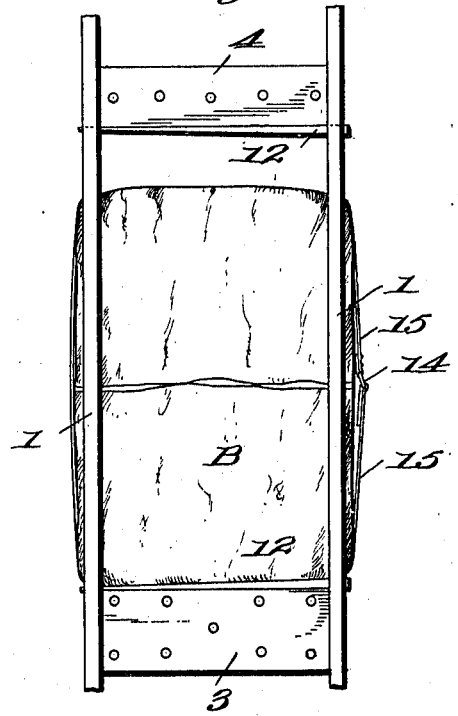
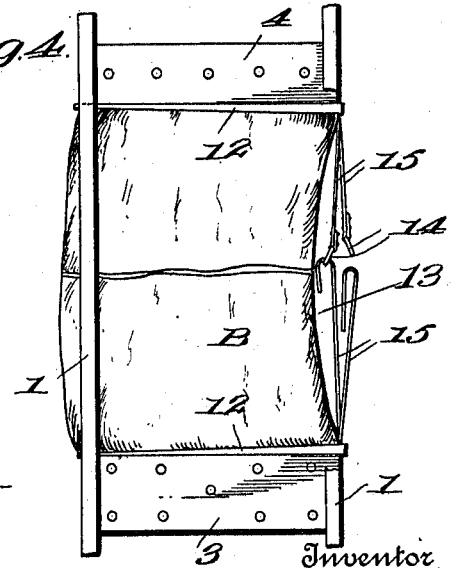
Witnesses
J. M. Wynkoop
H. N. Byrd
Inventor,
Payton Leon Howlett,
By Knight Bros
Attorneys.

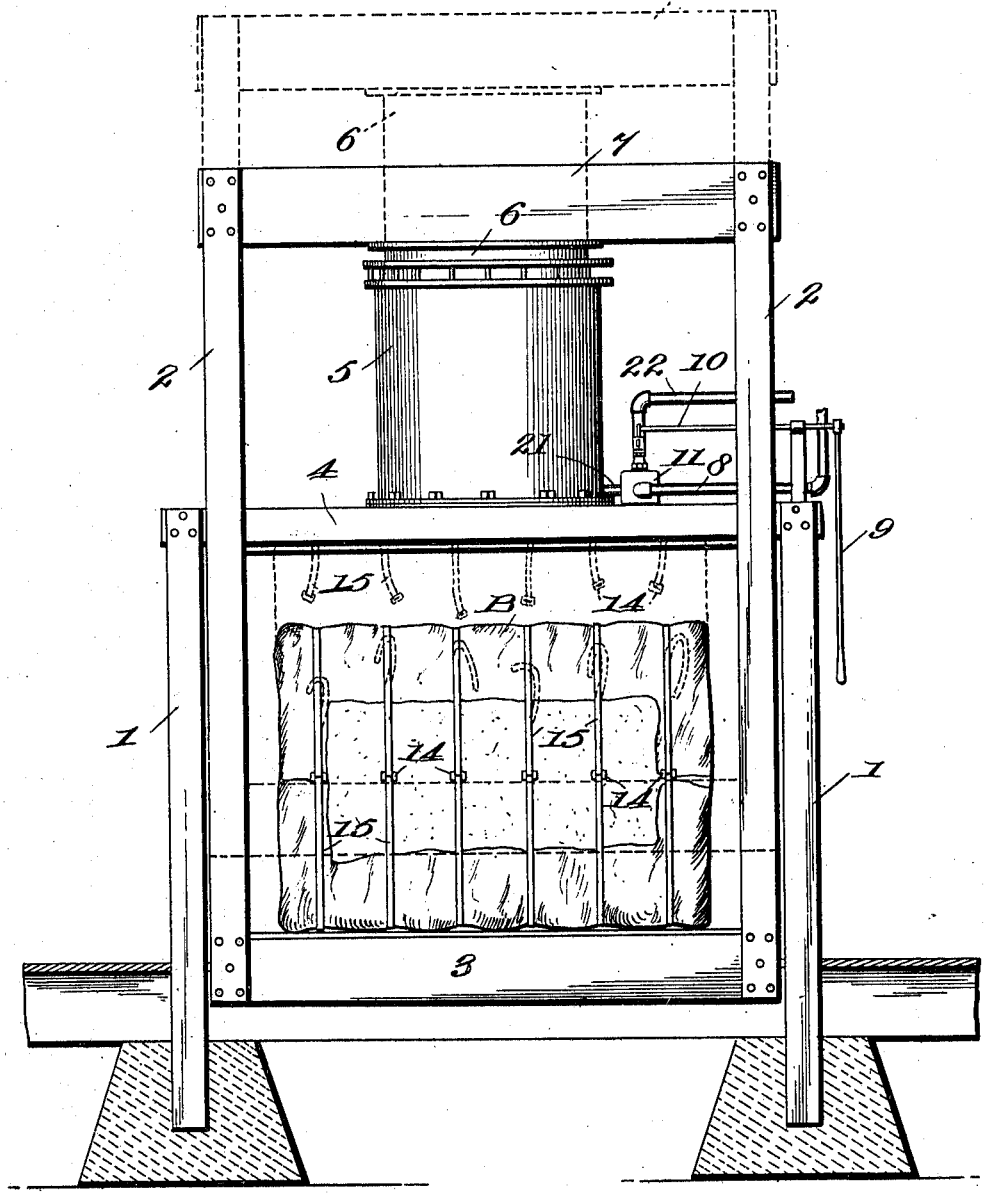

P. L. HOWLETT.
COTTON TIE PRESS.
APPLICATION FILED AUG. 18, 1909.
988,469.
Patented Apr. 4, 1911.
3 SHEETS—SHEET 3.
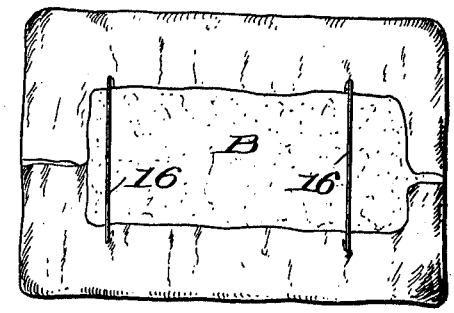
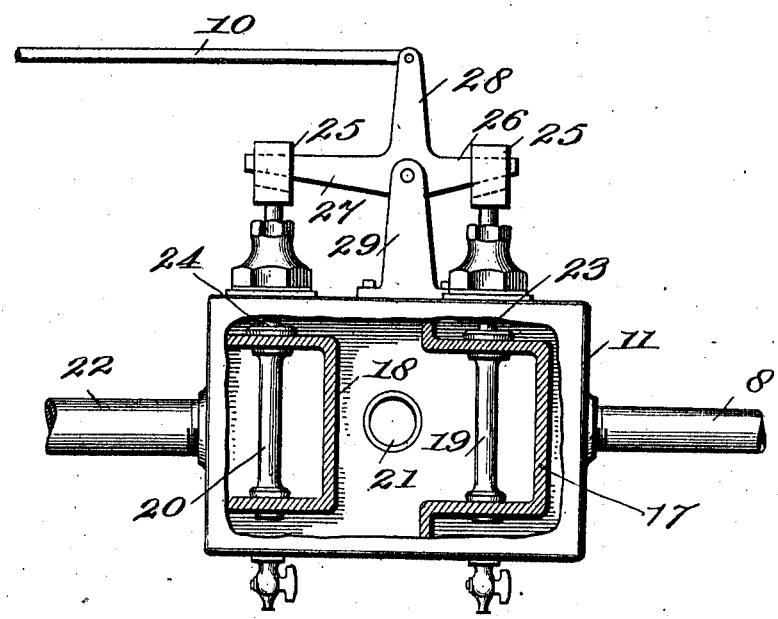

UNITED STATES PATENT OFFICE.

PAYTON LEON HOWLETT, OF BROWNWOOD, TEXAS.

COTTON TIE-PRESS.

988,469.  Specification of Letters Patent.  Patented Apr. 4, 1911.

Application filed August 18, 1909. Serial No. 513,450.

*To all whom it may concern:*

Be it known that I, PAYTON LEON HOWLETT, a citizen of the United States, residing in the city of Brownwood, county of Brown, and State of Texas, have invented certain new and useful Improvements in Cotton Tie-Presses, of which the following is a specification.

The present invention relates to presses particularly of the type employed for baling cotton and has for its purpose to provide such a press of an auxiliary character wherein the bale is compressed in a manner which permits of the removal in whole of its temporary binding ties preparatory to submitting the bale to its final compression before shipment.

Under the present method of baling cotton the material when coming from the gin is covered with jute bagging and the whole tied with usually six bands each being approximately eleven feet in length, and in this condition the bale is carried on trucks to the compress. Preparatory to being placed therein the top and bottom edges of the bagging are temporarily connected by hooks and the bands or ties cut following which the bale is compressed and held intact by eight ties of approximately eight feet in length and in this condition the bales are ready for shipment. This system of baling cotton is attended with many disadvantages, viz; the six ties mentioned are cut from the bale at points near the buckles, which points are usually about 18 to 24 inches from the ends of the ties. The six longer sections are then carried to a bench and cut to give eight foot lengths; the remaining pieces being between 18 and 24 inches long. These eight foot sections are subsequently used in the final compression and the shorter pieces, of which there are twelve, are riveted or otherwise welded to provide the two additional bands required on the final baling. As will be clear this not only consumes considerable time but considerably increases the cost of the bale and which by reason of the narrow margin in the marketing of the product, is a considerable item.

The purpose of my present invention as above stated is to provide an auxiliary press, in which the bales after coming from the gin, are subjected to pressure and which by reason of the peculiar structure of the press permits of the ready removal of the several baling bands in whole, and the details of structure and manner of operation of which will be explained in full in the course of the following description and the points of novelty thereof set forth in the claims.

The invention is shown by way of illustration in the accompanying drawings, wherein—

Figure 1 is a front elevation of a baling press embodying my improvement, and showing in dotted lines the press in operation, Fig. 2 is a side elevation thereof, Fig. 3 is a side elevation of the compression platens in detail and a bale to be compressed, Fig. 4 is a view corresponding to Fig. 3 showing the bale compressed, Fig. 5 is a side view of a bale having been compressed and the ties removed, and Fig. 6 is a side elevation, partly in section, of the valve mechanism employed in the present device.

Referring to the several figures in detail and wherein like characters of reference indicate corresponding parts in the several views shown, 1 refers to a frame-work suitably supported and adapted to hold therein the vertically reciprocating frame 2 the beam 3 whereof constitutes one of the compression platens for the bale B and with which coöperates the platen 4 which constitutes a part of the stationary frame. Supported upon the platen beam 4 is a cylinder 5 within which is adapted to move the piston or plunger 6 carried by the cross beam 7 of the movable frame 2. Communicating with the cylinder chamber 5 and near its base is a pipe 8 which leads from the source of pressure. For admitting the fluid medium within the cylinder 5 a hand lever 9 is mounted in convenient proximity for the operator and through the connecting rod 10 actuates a valve mechanism contained in the casing 11 and the details of which valve mechanism form an essential part of the present invention and will be described in full detail hereinafter.

The active faces of each of the compression platens 3 and 4 have suitably secured thereon plates 12 which are inclined or of varying thickness throughout their length and which by reason of their peculiar disposition, i. e. with corresponding portions opposed, with relation to each other cause the bale B to be bulged into substantially that manner shown in Fig. 4 and by reason of which distortion thereof a recess or cavity designated by the numeral 13 is effected. This space 13 affords the necessary room whereby the buckles 14 or other means for fastening the bales 15 may be manipulated for effecting their disconnection in order that they may be removed in whole, and following which removal the covering of the bale is gathered by means of the hooks 16 as shown in Fig. 5 and described in the preamble of the specification. The bale ties which have been removed in whole are then cut into eight and three feet lengths respectively; the former being subsequently used in the final baling, and the six three feet lengths are united to provide the two additional bands required. Thus by my improved method of removing the ties in whole the compress operator is enabled to save the entire tie by having the six pieces three feet long intact for splicing or welding together, while in the old method there are twelve or more pieces cut off from each bale.

The object of the inclined platens of the tie press is to get the desired slack in the ties, with a minimum of pressure. Presses using straight platens will effect the required slack in the ties but require considerably more power than in the former instance, and as any excess of power must necessarily require a proportionate amount of steam, it will be evident that the cost of baling with the latter type of press will be considerably more than with baling by the former method, and since a single press acts upon thousands of bales, this increase in cost amounts to considerable.

Referring now to the details of the valve mechanism, the same comprises a casing 11 with which is cast the valve seats 17 and 18 for the inlet and outlet valves 19 and 20 respectively and with which communicates the inlet 21 to the cylinder 5 and the exhaust 22. Each of the valves 19 and 20 is fitted with an upwardly disposed stem 23 and 24 respectively which stems are of identical structure and are further alike in that each has its upper or free end in the form of a casting 25 within the openings of which is adapted to move respectively the short and long arms 26 and 27 of the throttle lever 28, which in turn connects with the actuating rod 10. The lever 28 is fulcrumed on the support 29 in such manner that it requires a comparatively long throw of said lever to effect the entrance of the steam within the cylinder thereby giving a steady and gradual movement of the press; and which by reason of the increased leverage of the arm 27 effects a comparatively instantaneous opening of the exhaust. The present valve structure is further novel in that the operation of the inlet valve positively effects the closing of the exhaust valve and vice versa. The means by which this is accomplished resides in the peculiar construction of the members 25 with relation to their relative operating arms of the lever 28. Each of the arms 26 and 27 has freedom of movement within the heads 25 and consequently when exerting a lifting effect on one it acts reversely on the other as stated.

From the foregoing it will be evident that a bale, such as that of the character mentioned, may be compressed in the manner described so as to laterally deflect the same and thereby concave one of its exposed faces in order that the buckles or other fastening means of the tying devices may be readily manipulated for removing the ties in whole, or perhaps in applying them to position. And while the means herein shown and described will, for all practical purposes, effect this result it will be understood that modifications in the form of platens may be employed within the purview of the invention; thus the platen may be pivotally supported off of a true center whereby to exert an excess of pressure on one side of the bale, i. e. directly beneath the platen fulcrum, and in that manner deflect the bale to concave one face thereof.

Having thus described my invention, what I claim as new therein and desire to secure by Letters Patent, is:—

1. A bale press comprising coöperating platens having pressing faces approaching nearer to each other on one side than on the other, whereby they exert an excess of pressure on one side of and deflect a column of material pressed between them, and effect a recess in one face of said column.

2. A bale press having a platen and a coöperating element, said platen provided with a straight inclined face adapted to exert excess of pressure on one side of a column of material pressed between said platen and its coöperating element, thereby effecting a recess in one face of the column.

3. A bale press having platens oppositely disposed and each provided with a straight inclined surface adapted to exert excess of pressure on one side of a column of material pressed between said platens, thereby effecting a recess in one face of the column.

4. A bale press having platens oppositely disposed and provided with straight inclined surface plates, said plates being disposed in opposed relation and adapted to coöperate to exert an excess of pressure on one side of a column of material pressed between said platens, thereby effecting a recess in one face of the column.

5. A bale press having platens provided with surface plates of varying thickness throughout their length, said plates being disposed with corresponding thicknesses in opposite relation whereby to exert excess of pressure on one side of a column of material
5 pressed between said plates and thereby effecting a recess in one face of the column.

The foregoing specification signed at Brownwood, Texas, this second day of June, 1909.

PAYTON LEON HOWLETT.

In presence of two witnesses:
Cyrus A. Tunnell,
Will A. Bell.

Copies of this patent may be obtained for five cents each, by addressing the "Commissioner of Patents, Washington, D. C."